United States Patent [19]
Leymann et al.

[11] Patent Number: 5,960,420
[45] Date of Patent: Sep. 28, 1999

[54] SYSTEMS, METHODS AND COMPUTER PROGRAM PRODUCTS FOR IMPLEMENTING A WORKFLOW ENGINE IN DATABASE MANAGEMENT SYSTEM

[75] Inventors: Frank Leymann, Aidlingen; Dieter Roller, Schönaich, both of Germany

[73] Assignee: International Business Machines Corporation, Armonk, N.Y.

[21] Appl. No.: 08/923,748

[22] Filed: Sep. 2, 1997

[30] Foreign Application Priority Data

Sep. 11, 1996 [EP] European Pat. Off. .............. 96114506

[51] Int. Cl.$^6$ .................................................. G06F 17/30
[52] U.S. Cl. ................. 707/1; 707/10; 707/100; 707/104
[58] Field of Search .................. 707/1, 103, 10, 707/100, 104; 705/8

[56] References Cited

U.S. PATENT DOCUMENTS

| | | | |
|---|---|---|---|
| 5,301,320 | 4/1994 | McAtee et al. | 705/9 |
| 5,649,220 | 7/1997 | Yosefi | 707/526 |
| 5,721,913 | 2/1998 | Ackroff et al. | 707/103 |
| 5,799,297 | 8/1998 | Goodridge et al. | 707/1 |
| 5,826,239 | 10/1998 | Du et al. | 705/8 |
| 5,848,393 | 12/1998 | Goodridge et al. | 705/8 |

OTHER PUBLICATIONS

Sarin, Object–oriented workflow technology in InConcert, COMPCON 96, pp. 446–450, Feb. 28, 1996.
Alonso, "The role of database technology in workflow management systems", Proceedings IFCIS, Jun. 21, 1996.
IBM Software Solutions, IBM FlowMark for OS/2, Document No. GH 19–8215–01, 1994.
Leymann et al, "Managing Business Processes as an Information Resource", IBM Systems Journal, vol. 33, No. 2, 1994, pp. 326–348.
Leyman et al., "Business Process Management with Flow-Mark", IEEE, Spring COMPCON 94, 1994, pp. 230–234.
Leymann, "A Metal Model to Support Modelling and Execution of Process", Proceedings of the 11$^{th}$ European Meeting on Cybernetics and System Research EMCR92, Vienna, Austria, Apr. 22 to 14, 1992, pp. 287–294.
D.J. Spoon: Project Management Environment@, IBM Technical Disclosure Bulletin, vol. 32, No. 9A, Feb. 1990, pp. 250–254.
R. T. Marshak: IBM's FlowMark, Object–Oriented Workflow for Mission–Critical Applications@, Workgroup Computing Report (USA), vol. 17, No. 5, 1994, pp. 3–13.
H. A. Inniss and J. H. Sheridan: Workflow Management Based on an Object–Oriented Paradigm@, IBM Technical Disclosure Bulletin, vol. 37, No. 3, Mar. 1994, p. 185.
D.Roller: Verifikation von Workflows in IBM FlowMark@, in J. Becker und G. Vosson (Hrsg.): "Geschaeftsprozess-modellierungt und Workflows", International Thompson Publishing, 1995.

*Primary Examiner*—Paul R. Lintz
*Assistant Examiner*—Sanjiv Shah
*Attorney, Agent, or Firm*—Myers Bigel Sibley & Sajovec; A. Bruce Clay

[57] ABSTRACT

Workflow management systems (WFMS) execute a multitude of process models including a network of potentially distributed activities. WFMS store WFMS state information on the process models, the process model instances currently executed by the WFMS, together with the instances's state and the state of the WFMS themselves, in Database Management Systems (DBMS). The WFMS engines encompassing a set of control functions are implemented directly within the DBMS. Only stubs corresponding to these control functions need be implemented within the WFMS. The stubs exploit the services of the control function cores within the DBMS. Such implementation architectures can increase performance of WFMS significantly as the control functions can operate on and within those computer systems which store the data on the WFMS state.

24 Claims, 8 Drawing Sheets

```
CREATE TABLE Processes (
        MID              CHAR (32)       NOT NULL ,
        AuditTrail       SMALLINT        NOT  NULL ,
        CONSTRAINT Processes_pk
            PRIMARY KEY (MID)
)
```

FIG. 1

```
CREATE TABLE Activities (
        MID              CHAR (32)       NOT NULL ,
        AID              INTEGER         NOT NULL ,
        ActivityPos      SMALLINT        NOT NULL ,
        StaffAssignment  VARCHAR (256)   NOT NULL ,
        CONSTRAINT Activities_pk
            PRIMARY KEY (MID, AID)
)
```

FIG. 2

```
1  EXEC SQL BEGIN DECLARE SECTION ;
      char procName [255] = "startPrc" ;
      char processModelId [33] = "LoanProcess" ;
   EXEC SQL END DECLARE SECTION ;

2  EXEC SQL CALL  :procName (:processModelId) ;   -
```

FIG. 9

```
CREATE TABLE ProcessInstances (
PID              CHAR (32)        NOT NULL ,
MID              CHAR (32)        NOT NULL ,
State            INTEGER          NOT NULL ,
CONSTRAINT ProcInstances_pk
    PRIMARY KEY (PID,)
)
```

FIG. 3

```
CREATE TABLE ActivityInstances (
PID              CHAR (32)        NOT NULL ,
AID              INTEGER          NOT NULL ,
State            SMALLINT         NOT NULL ,
CONSTRAINT ActInstances_pk
    PRIMARY KEY (PID,AID)

```
CREATE TABLE WorkItems (
PID              CHAR (32)        NOT NULL ,
AID              INTEGER          NOT NULL ,
UID              CHAR (32)        NOT NULL ,
CONSTRAINT WorkItems_pk
    PRIMARY KEY (PID,AID, UID)
)
```

FIG. 5

```
1  SELECT processInformation FROM Processes
       WHERE MID = :processModelId
2  processState = 'running'
   processInstanceId = uniqueNumber
   INSERT INTO ProcessInstances (PID, MID, State)
       VALUES (:processInstanceId,
                :processModelId,
                :processState)
3  DECLARE startActivities AS CURSOR FOR
       SELECT AID, StaffAssignment FROM Activities WHERE
           MID = :processModelId AND
           ActivityPos = StartActivity
4  OPEN startActivities
5  DO UNTIL allStartActivitiesRetrieved
6      FETCH startActivities INTO  :activityId,
                                    :staffAssignment
7      activityState = 'ready'
       INSERT INTO ActivityInstances (PID, AID, State)
           VALUES (:processModelId,
                    :activityId,
                    :activityState)
8      PREPARE staffResolution FROM :staffAssignment
9      DECLARE staffResolutionCursor
               AS CURSOR FOR staffResolution
10     OPEN staffResolutionCursor
11     DO UNTIL assignedAssignedStaffIsRetrieved
12         FETCH staffResolutionCursor INTO  :userid
13         INSERT INTO WorkItems (PID, AID, UID)
               VALUES (:processModelId, :activityId,
                        :userID)
14     END
15     CLOSE staffResolutionCursor
16 END
17 CLOSE startActivities
```

SYSTEMS, METHODS AND COMPUTER PROGRAM PRODUCTS FOR IMPLEMENTING A WORKFLOW ENGINE IN DATABASE MANAGEMENT SYSTEM

FIELD OF THE INVENTION

The present invention relates to data processing systems, methods and computer program products, and more particularly to workflow management systems (WFMS), methods and computer program products that run on data processing systems.

BACKGROUND OF THE INVENTION

A new area of technology with increasing importance is the domain of Workflow-Management-Systems (WFMS). WFMS support the modeling and execution of business processes. Business processes control which piece of work of a network of pieces of work will be performed by whom and which resources are exploited for this work. Thus, a business process describes how an enterprise will achieve its business goals. The individual pieces of work might be distributed across a multitude of different computer systems connected by a network.

The processes of designing, developing and manufacturing new products and the process of changing or adapting existing products present many challenges to product managers and engineers to bring the products to market at low cost and within schedule while maintaining or even increasing product quality. Many companies are realizing that the conventional product design process may not be satisfactory to meet these needs. Thus, they may involve manufacturing engineering, cost engineering, logistic planning, procurement, manufacturing, service and support early in the design effort. Furthermore, they may plan and control product data through design, release, and manufacturing.

The correct and efficient execution of business processes within a company, such as development or production processes, may be of enormous importance for a company and may be a significant influence on company's overall success in the marketplace. Therefore, those processes are being regarded similar to technology processes and are being tested, optimized and monitored. The management of such processes is usually performed and supported by a computer based process or workflow management system.

In D. J. Spoon: "*Project Management Environment*", IBM Technical Disclosure Bulletin, Vol. 32, No. 9A, February 1990, pages 250–254, a process management environment is described including an operating environment, data elements, and application functions and processes.

In R. T. Marshak: "*IBM's FlowMark, Object-Oriented Workflow for Mission-Critical Applications*", Workgroup Computing Report (USA), Vol. 17, No. 5, 1994, page 3–13, the object character of IBM FlowMark as a client/server product built on a true object model that is targeted for mission-critical production process application development and deployment is described.

In H. A. Inniss and J. H. Sheridan: "*Workflow Management Based on an Object-Oriented Paradigm*", IBM Technical Disclosure Bulletin, Vol. 37, No. 3, March 1994, page 185, other aspects of object-oriented modelling on customization and changes are described.

In F. Leymann and D. Roller: "*Business Process Management with FlowMark*", Digest of papers, Cat. No. 94CH3414-0, Spring COMPCON 94, 1994, pages 230–234, the state-of-the-art computer process management tool IBM FlowMark is described. The meta model of IBM FlowMark is presented as well as the implementation of IBM FlowMark. The possibilities of IBM FlowMark for modelling of business processes as well as their execution are discussed. The product IBM FlowMark is available for different computer platforms, and documentation for IBM FlowMark is available from IBM.

In F. Leymann: "*A Meta Model to Support the Modelling and Execution of Processes*", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "*IBM FlowMark for OS/2*", document number GH 19-8215-01, IBM Corporation, 1994, available from IBM, represents a modern, sophisticated, and powerful workflow management system. It supports the modelling of business processes as a network of activities. This network of activities, referred to as the process model, is constructed as a directed, acyclic, weighted, colored graph. The nodes of the graph represent the activities or work items which are performed. The edges of the graph, referred to as the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e. g. by assigning tasks to a work list according to the respective person, wherein the work list is stored as digital data within the workflow or process management computer system.

In F. Leymann and W. Altenhuber: "*Managing Business Processes as an Information Resource*", IBM Systems Journal, Vol. 32(2), 1994, the mathematical theory underlying the IBM FlowMark product is described.

In D. Roller: "*Verifikation von Workflows in IBM FlowMark*", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

To implement a computer based process management system, the business processes are analyzed and, as the result of this analysis, a process model is constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

Most workflow management systems (WFMS) keep process model information and the state information for the process instances in some type of database management system (DBMS). Relational database management system (RDBMS) are important candidates for that purpose. The WFMS control functions of a WFMS engine, such as navigating through the process graph, performing staff resolution and invoking programs, operate to access the information in the database, make the appropriate computations, and store new state information in the database. Access to the database takes place for instance via the appropriate SQL calls. However, even if WFMS make use of DBMS, both areas generally are completely different areas of technology.

It is generally desirable to improve a WFMS's throughput and responsiveness. Throughput and responsiveness may be impaired by the distributed nature of executing process models by WFMS, the huge amount of WFMS state information for very complex process models and the potentially large number of simultaneous users of a WFMS. Thus, there is a continuing need to improve internal processing speed and throughput of the WFMS to deliver as much as possible of the computer systems' processing power to the business processes themselves.

SUMMARY OF THE INVENTION

It is therefore an object of the present invention to provide improved workflow management systems, methods and computer program products.

It is another object of the present invention to provide workflow management systems, methods and computer program products that are capable of improved throughput and responsiveness.

These and other objects are provided, according to the present invention, by dividing the workflow management system into a workflow management system core and a workflow management system stub. The workflow management system core is placed within the database management system, so that the state of the workflow management system is administrated within the database management system. By not requiring excessive control information and data to pass between the workflow management system and the database management system, improved throughput and responsiveness can be provided.

In particular, data processing systems for managing workflow include a database management system and a workflow management system. The database management system and the workflow management system communicate with one another over a communication channel. The database management system includes a database containing process model information and state information for process instances. A workflow management core is also included within the database management system. The workflow management system core is responsive to service requests over the communication channel, to control processing of the process model information and state information to process instances in the database. The state of the workflow management system is thereby administrated within the database management system. The results of the processing of the process model information and state information are returned over the control channel.

The workflow management system includes a workflow management system stub. The workflow management system stub is responsive to user inputs to generate the service requests and to transmit the service requests to the workflow management system core over the communications channel. The workflow management system stub also receives the results of processing of the process model information and state information from the workflow management system core over the communications channel. Accordingly, interactions between the workflow management system and the database need not be communicated over the communications channel.

Accordingly, database management systems and workflow management systems may operate, according to the present invention, by generating service requests for the workflow management system and transmitting the service requests to the database management system over the communications channel. In response to received service requests over the communication channel, processing of the process model information and state information for process instances in the database is controlled, to thereby administrate the state of the workflow management system within the database management system. The results of the processing of the process model information and state information is transmitted from the database management system over the communications channel such that interactions between the workflow management system and the database need not be communicated over the communications channel.

Most WFMS keep process model information and the state information for the process instances together with detailed status information on the execution status of the process by the WFMS in a relational database management system (RDBMS), or some other type of database management system (DBMS). Thus the RDBMS store WFMS state information of the WFMS itself and of the process model instance currently executed by the WFMS. The WFMS control functions, such as navigating through the process graph, performing staff resolution and invoking programs, operate to access the WFMS state information in the database, make the appropriate computations, and store new state information in the database. Access to the database takes place via the appropriate SQL DBMS calls.

According to the present invention, and in contrast with the current state of the art, WFMS control functions are no longer implemented within the WFMS system itself. Rather, the present invention implements the WFMS engines, encompassing a set of control functions, directly within the DBMS. Only stubs corresponding to these control functions are still implemented within the WFMS. These stubs request the services of the WFMS control function cores within the DBMS.

Thus, the present invention can increase performance of WFMS significantly as the WFMS control functions mainly operate on and within the DBMS that stores the data on the WFMS state. Typically a WFMS control function performs a multitude of DBMS accesses. With implementations of WFMS control function according to the invention, all DBMS access can take place from within the WFMS control function core executed directly within the DBMS itself. Such an approach is advantageous as the network traffic can be reduced significantly. Network access is no longer required for each DBMS access. A single network access is sufficient to request the service of the WFMS control function core.

Further performance benefits may be achieved by reducing the number of process switches due to the WFMS control function core operating directly within the DBMS. Moreover the present invention allows for an integration of two separate technologies, the WFMS and the DBMS technologies. Since the WFMS engine is now part of a DBMS, WFMS may be viewed and treated as DBMS extensions.

According to another aspect of the invention, stored procedure technology of DBMS is used as implementation technology for the WFMS control function cores. Such an approach allows an available and proven technology to be used. Moreover, this approach can generate the largest performance benefits as it can lead to the tightest integration of WFMS and DBMS systems. Within the DBMS area of technology the concept of stored procedures is known. Stored procedures allow an application program to be run in two parts. One part runs on the client and the other on the server. This can allow one call to a remote database to execute a procedure, that may represent several, repetitive accesses to the database. The server procedure at the database can run within the same transaction as the client application. However, it does not appear that WFMS have heretofore used stored procedure technology to implement WFMS control function cores.

According to another aspect of the invention, all WFMS control functions are implemented with DBMS access within the DBMS. This approach can maximize the above-mentioned benefits and can result in maximum integration of WFMS and DBMS computer systems.

According to yet another aspect of the invention, a three tier structure including a WFMS client computer system, a WFMS server computer system and a DBMS system is provided. Such a system allows the present invention to be applied to almost all existing WFMS. It will be understood that the present invention may be embodied as systems (apparatus), methods, computer program products and combinations thereof.

BRIEF DESCRIPTION OF THE DRAWINGS

FIG. 1 is a diagram reflecting a conceptual record structure of a "Processes" build time table.

FIG. 2 is a diagram reflecting a conceptual record structure of an "Activities" build time table.

FIG. 3 is a diagram reflecting a conceptual record structure of a "Process Instances" run-time table.

FIG. 4 is a diagram reflecting a conceptual record structure of an "Activity Instances" run-time table.

FIG. 5 is a diagram reflecting a conceptual record structure of a "Work Item" table.

FIG. 6 is a visualization of a WFMS control function "Start a Process Instance" in pseudo-code.

FIG. 9 is a diagram of a WFMS control function stub for the "Start a Process Instance" example of FIG. 6.

DETAILED DESCRIPTION OF PREFERRED EMBODIMENTS

Figure 7:
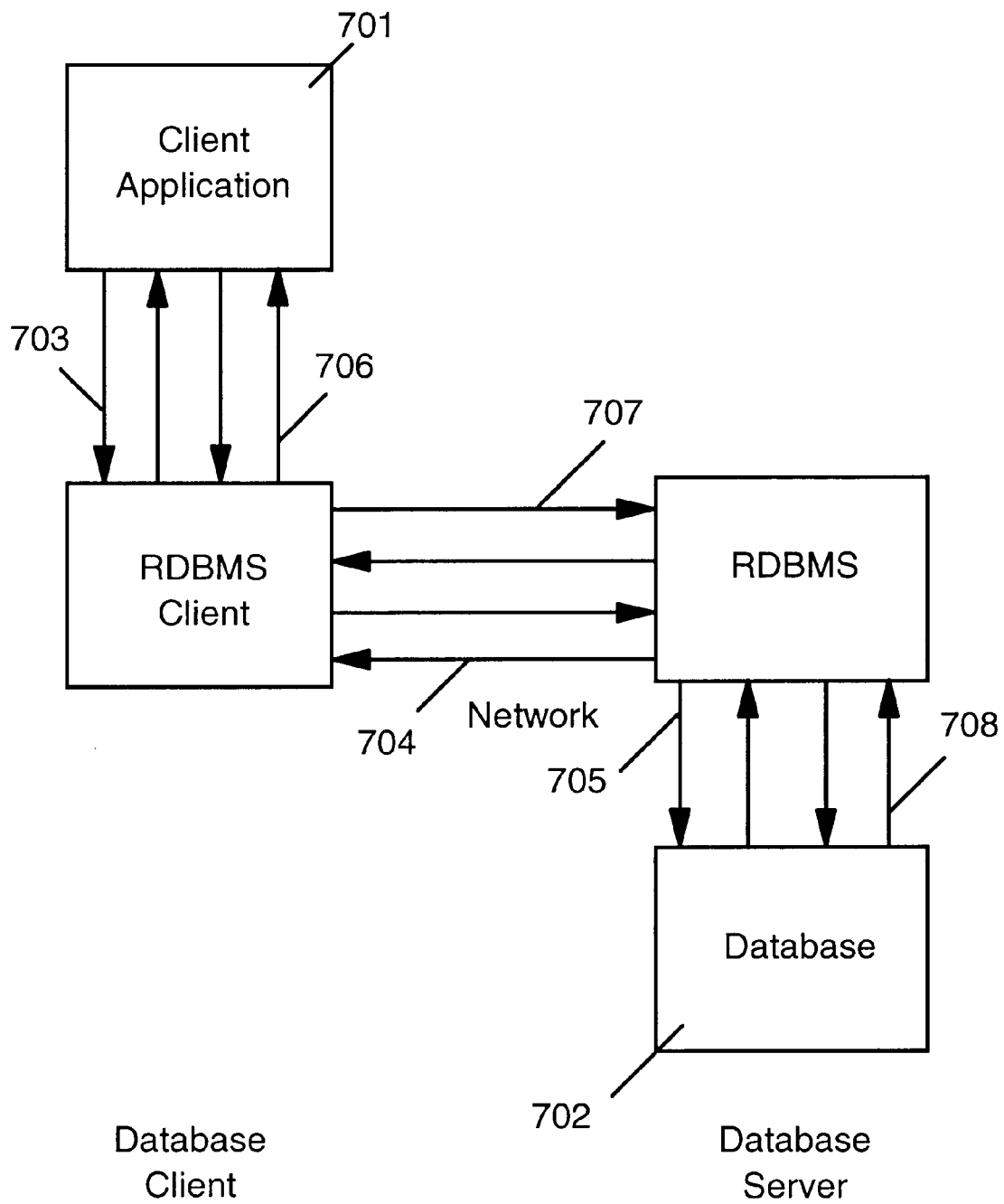
FIG. 7 is a block diagram of a conventional database application accessing a database.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is illustrated based on IBM's FlowMark workflow management system. Of course any other WFMS can be used instead. Furthermore, the present invention applies also to any other type of system which offers WFMS functionalities, not as a separate WFMS, but within some other type of system. When the description refers to a RDBMS this is meant as an example. Other types of DBMS can be used instead.

1. Introduction

The following is a short outline on the basic concepts of a workflow management system based on IBM's FlowMark WFMS:

From an enterprise point of view the management of business processes is becoming increasingly important. Business processes control which piece of work will be performed by whom and which resources are exploited for this work. In other words, a business process describes how an enterprise will achieve its business goals. A WFMS may support both the modeling of business processes and their execution.

Modeling of a business process as a syntactical unit in a way that is directly supported by a software system is extremely desirable. Moreover, the software system can also work as an interpreter basically obtaining as input such a model. The model, called a process model, can then be instantiated and the individual sequence of work steps depending on the context of the instantiation of the model can be determined. Such a model of a business process can be perceived as a template for a class of similar processes performed within an enterprise. It is a schema describing all possible execution variants of a particular kind of business process. An instance of such a model and its interpretation represents an individual process, i.e. a concrete, context dependent execution of a variant prescribed by the model. A WFMS facilitates the management of business processes. It allows modeling of business processes (build time) and it drives business processes based on an associated model (run time). The meta model of IBM's WFMS FlowMark, i.e. the syntactical elements provided for describing business process models, and the meaning and interpretation of these syntactical elements, is described next.

Activities are the fundamental elements of the meta model. An activity represents a business action that is from a certain perspective a semantical entity of its own. The model of the business process might have a fine-structure that is then represented in turn via a model, or the details of it may not be of interest from a business process modeling point of view. Refinement of activities via process models allows for both modeling business processes bottom-up and top-down.

Generally, the results that are produced by the work represented by an activity are put into an output container, which is associated with each activity. Since an activity will generally access output containers of other activities, each activity is also associated with an input container. At run time, the actual values for the formal parameters building the input container of an activity represent the actual context of an instance of the activity.

Since activities might not be executed arbitrarily they are bound together via control connectors. A control connector might be perceived as a directed edge between two activities. The activity at the connector's end point cannot start before the activity at the start point of the connector has finished (successfully). Control connectors thus model the potential flow of control within a business process model.

In addition, a Boolean expression called a transition condition is associated with each control connector. Parameters from output containers of activities having already produced their results are followed as parameters referenced in transition conditions. When at run time an activity terminates successfully, all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions thus model the context dependent actual flow of control within a business process (i.e. an instance of a model).

FlowMark includes, at the highest level, a build time component and a run time component. The build time component supports the modeling of business processes according to the meta model described above, and the run time component supports the corresponding semantics. Both components are implemented in a client-server structure. The client delivers the interaction with the user via an object-oriented graphical interface, invokes local tools, and provides animation. The server maintains the database for process instances, navigates through the process graph, and assigns the activities to the proper resources.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefnition facility.

FlowMark distinguishes three main types of activities: program activities, process activities, and blocks. Program activities are implemented through programs. The programs are registered via the Program Definition facility. Blocks contain the same constructs as processes, such as activities, control connectors etc. They are, however, not named and have their own exit condition. If the exit condition is not met, the block is started again. The block thus implements a "do until" construct. Process activities are implemented as processes. These subprocesses are defined separately as regular, named processes with all their usual properties.

Process activities offer great flexibility for process definition. They not only allow construction of a process through permanent refinement of activities into program and process activities (top-down), but also can build a process out of a set of existing processes (bottom-up). In particular, process activities help to organize the modeling work if several process modelers are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situations, but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place, similar to header files in programming languages.

Programs which implement program activities are defined via the Program Registration Facility. Registered for each program is the name of the program, its location, and the invocation string. The invocation string includes the program name and the command string passed to the program.

Before process instances can be created, the process model is translated to ensure the correctness and completeness of the process model. The translated version of the model is used as a template when a process instance is created. This allows changes to be made to the process model without affecting executing process instances. A process instance is started either via the graphical interface of via the callable process application programming interface.

When a process is started, the start activities are located, the proper people are determined, and the activities are posted onto the work list of the selected people. If a user selects the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people.

A process is considered terminated if all end activities have completed. To make sure that all end activities finish, a death path analysis is performed. It removes all edges in the process graph which can never be reached due to failing transition conditions. All information about the current state of a process is stored in the database maintained by the server. This allows for forward recovery in the case of crashes.

2. The WFMS Engine and Control Functions

Most workflow management systems (WFMS) keep process model information and the state information for the process instances together with detailed status information on the execution status of the process by the WFMS in a relational database management system (RDBMS), or some other type of database management system (DBMS). Thus the RDBMS store WFMS state information of the WFMS itself and of the process model instance currently executed by the WFMS. The WFMS control functions, such as navigating through the process graph, performing staff resolution, invoking programs and many more access the WFMS state information in the database, make the appropriate computations, and store new state information in the database. Access to the database may take place via the appropriate SQL DBMS calls.

According to the current state of the art the WFMS control functions are implemented within the WFMS system itself. As a control function may access the RDBMS repeatedly, many repetitive WFMS to RDBMS interactions may occur. In contrast, the present invention can reduce a significant amount of these WFMS-to-RDBMS interactions, thus improving the WFMS system performance significantly. The collection of above mentioned control functions generally build the heart of a WFMS called the WFMS engine.

For illustration purposes, a typical implementation of a certain WFMS control function on top of a RDBMS, i.e. which makes use of the RDBMS, will be outlined in greater detail. It will be understood that this example applies to other WFMS control functions also. The control function Start a Process Instance will be chosen for that objective. This control function is part of the WFMS navigator, a core piece of the WFMS engine. The WFMS navigator performs actions associated with processing the process model. The navigator understands a set of messages resulting in the execution of certain control functions such as:

process instance related messages, such as start, terminate, suspend, and resume a process, and
  activity related messages, such as finishing or starting a work item.

Each message results in the execution of a series of SQL calls. One of the messages for example is the request for starting a process instance.

The navigator relies with its operations on two sets of tables: build time tables and run time tables. The build time tables contain the static information determined during build time, such as process model information, staff directory, or program information. The run time tables contain the dynamic information determined during run time, such as the process instance information. The various table instances are stored within the RDBMS.

It should be noted that the outlined implementation is for illustrative purposes only, concentrating on the concept. An actual implementation may be far more complex. The examples are given in pseudo code in a simplified notion of SQL without any error checking. Details about SQL can be found in books about relational databases.

3. Build Time Tables and Run Time Tables

3.1 Build Time Tables

FIG. 1 shows the table structure of a main build time table, the Processes table, which contains one entry for each process model and can serve as an anchor point for all build time tables. MID, the key of the table, contains the process name, which uniquely identifies a process model. This key is referenced by build time and run time tables. In addition, the table contains process model related information, such as whether an audit trail should be written or not.

FIG. 2 shows the table structure of an Activities build time table. An entry is maintained in the table for each activity in a process model. It is uniquely identified by the AID column. MID contains the identifier of the appropriate process model. The ActivityPos field contains an indicator about the relative position of the activity within the process model, such as whether the activity is a start or and end activity. Among other things, this helps to quickly determine start activities when a process is started. The StaffAssignment field contains an SQL statement which is the SQL representation of the staff assignment. At run time, the SQL statement is executed dynamically to obtain those users who should receive the activity as a work item.

FIG. 3 shows the table structure of the main run time table, the ProcessInstances table, which contains one entry per process instance. PID uniquely identifies each process instance. The appropriate process model identifier is stored in MID. State contains the actual state of the process instance, such as running, suspended, or terminated.

FIG. 4 shows table structure of an ActivityInstances table, which contains one entry for each activity instance. PID is the identifier of the process instance this activity instance belongs to, AID the identifier of the activity within the process model. Both together uniquely identify an activity instance. State contains the current state of the activity instance, such as ready, active, or finished.

FIG. 5 shows the table structure of a work item table which is used to maintain the workitems associated with a particular activity of a process instance. One entry is maintained for each user who gets the activity assigned.

3.2 Starting a Process

FIG. 6 shows an appropriate code fragment of a control function to start a process. According to the state of the art this control function would be implemented on that computer system acting as the WFMS. It is important to recognize the multitude of SQL statements resulting in a multitude of separate interactions between the WFMS and the potentially remote RDMS.

Statement 1 retrieves the appropriate process model information from the Processes build time table. Statement 2 sets the process instance state to running, creates a unique process instance identifier, and inserts this information into the ProcessInstances table. Statement 3 declares a cursor to retrieve all start activities (ActivityPos=StartActivity) for the appropriate process model. The cursor is opened in statement 4. Statement 5 starts a loop over all start activities. Statement 6 retrieves for each activity the appropriate staff resolution and the activity identifier. Statement 7 sets the activity instance state to active and inserts an appropriate entry for the activity instance into the ActivityInstances table.

As pointed out earlier, the staff resolution is maintained in the form of an SQL statement to access the staff database. This statement is then prepared for execution in statement 8. An appropriate cursor is defined in statement 9 to retrieve the user to be assigned, and then opened in statement 10. Statement 11 starts a loop to retrieve all user to whom the activity should be assigned as work item. Statement 12 fetches the appropriate user identifier and statement 13 inserts an appropriate entry into the WorkItems table. Statement 14 closes the cursor for retrieval of the assigned users. Processing of starting a process terminates with closing the cursor for retrieving the start activities.

4. Stored Procedures

FIG. 7 shows how a conventional database manager application 701 accesses a database 702 located on a database server. Each individual access 703, 704, 705 or 706, 707, 708 to the database is communicated across the network or other communication channel.

Figure 8:
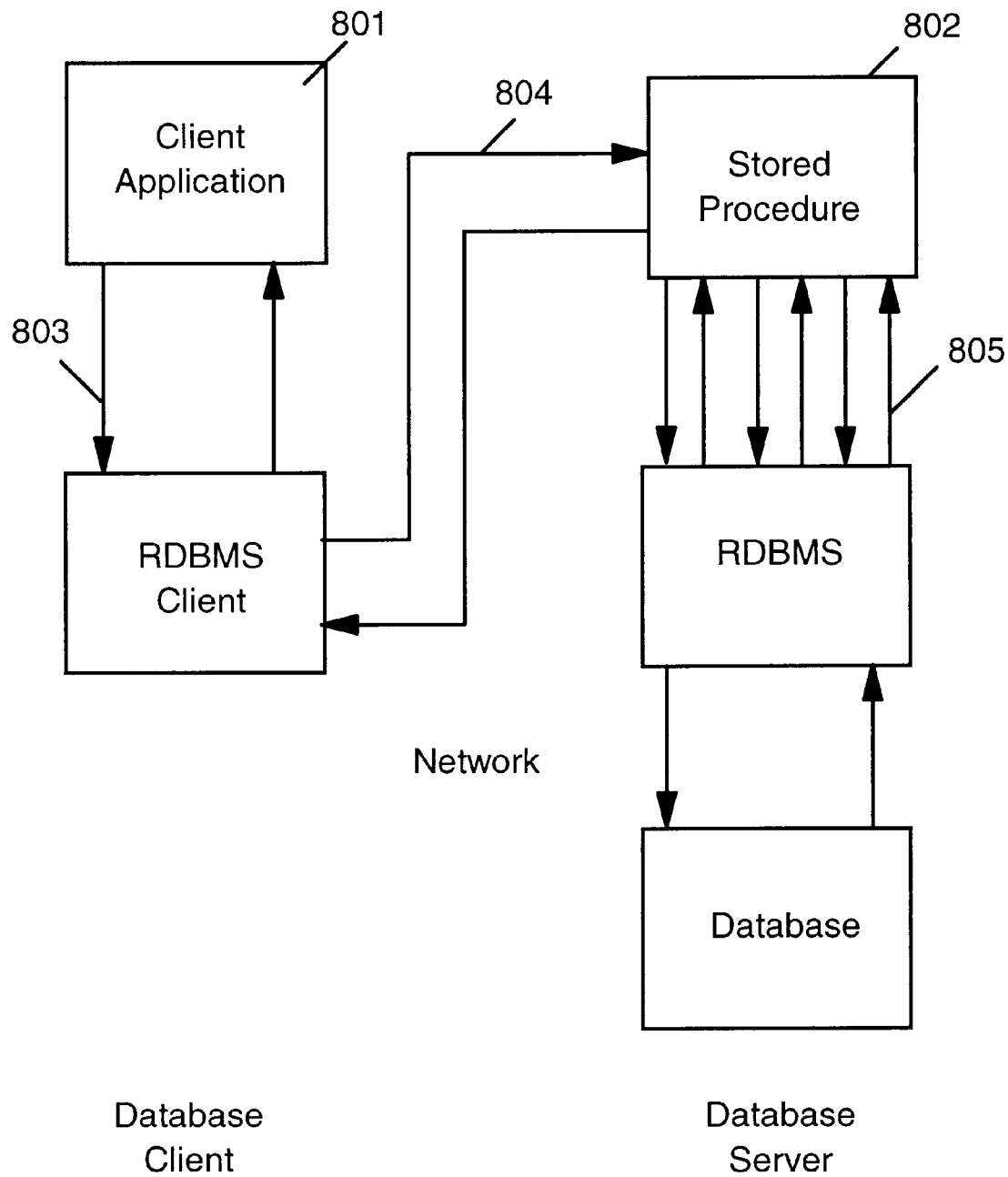
FIG. 8 is a block diagram of a database application accessing a database according to the present invention.

FIG. 8 shows the same application according to the present invention. The present invention can use stored procedures. A stored procedure is a technique that allows an application 801 running on a client to call a procedure 802 physically stored on a database server. The server procedure 802 executes and accesses the database locally to the DBMS and returns information to the client application. This approach is especially advantageous if the stored procedures access the database multiple times. Under these circumstances a single access 803, 804 of the application 801 is used across the network while the repetitive databases accesses 805 can be executed in a performance effective manner directly within the database system.

To use this technique, an application should be written in two separate procedures. The calling procedure 801 is contained in a client application and executes on the client. The server procedure 802 executes at the location of the database on the database server. The stored procedure 802 performs the processing on the database server, without requiring transmission of unnecessary data across the network. Only those records are actually required at the client may be transmitted. The server procedure at the database runs within the same transaction as the client.

In addition to all SQL calls, a stored procedure can also perform those DBMS features that exist only on the database server but not on the database client. These features include commands to list directories, such as LIST DATABASE DIRECTORY and LIST NODE DIRECTORY.

Stored procedures may execute in two different modes: fenced and non-fenced. A non-fenced procedure runs in the same address space as the database manager and results in increased performance when compared with a fenced stored procedure which runs in an address space that is isolated from the database manager. While performance improvements can be expected when running a non-fenced stored procedure, there is a danger that user code could accidentally damage the database control structures.

Applications using stored procedures may have the following advantages:

Reduced network traffic: Applications may process large amounts of data but require only a subset of the data be returned to the user. A properly designed application using stored procedures can return only the data that is needed by the client. The amount of data transmitted across the network can be reduced.

Improved performance of server intensive work Applications executing SQL statements can be grouped together without user intervention. The more SQL statements that are grouped together, the larger the savings in network traffic. A typical application may use two trips across the network for each SQL statement, whereas an application using the stored procedures technique may only use two trips across the network for each group of SQL statements. This can reduce the number of trips, and can result in a savings from the overhead associated with each trip.

Improved performance on single processor setup Stored procedures can provide some performance benefits in system setups where the application client and the database server are installed on the same physical machine. In this situation, traffic between machines may not be involved. However, address space (process) switching between the client and the server can be reduced. Every call may also require an authentication check, which may not be required for the calls within a stored procedure.

Based on the stored procedure technology a WFMS control function, such as the Start a Process Instance code fragment example for starting a process, may be implemented as two pieces. One piece is the client piece 801, for which a fragment is shown in FIG. 9. Statement 1 declares two host variables, procName to hold the name of the stored procedure which starts a process instance, and processModelId to hold the identifier (name) of the process model for which a process should be started. Statement 2 then calls the stored procedure startPrc and passes the name of the process model in parenthesis. Thus, this client piece of the WFMS control function may be a small stub representing the WFMS control function within the WFMS and which requests the associated service of the stored procedure within the DBMS to perform the service request and to deliver the actual processing results to a caller.

The actual core of the WFMS control function is represented by the stored procedure 802 which can be identical to the code fragment of the control function Start a Process Instance visualized in FIG. 6. In contrast to the state of the art WFMS technology, the WFMS control function core is no longer located within the WFMS, but within the DBMS storing the WFMS state information. A further difference, not shown in the figures, is a piece of initialization code which accepts the passed host variable.

5. Implementing WFMS Control Functions as Stored Procedures

Figure 10:
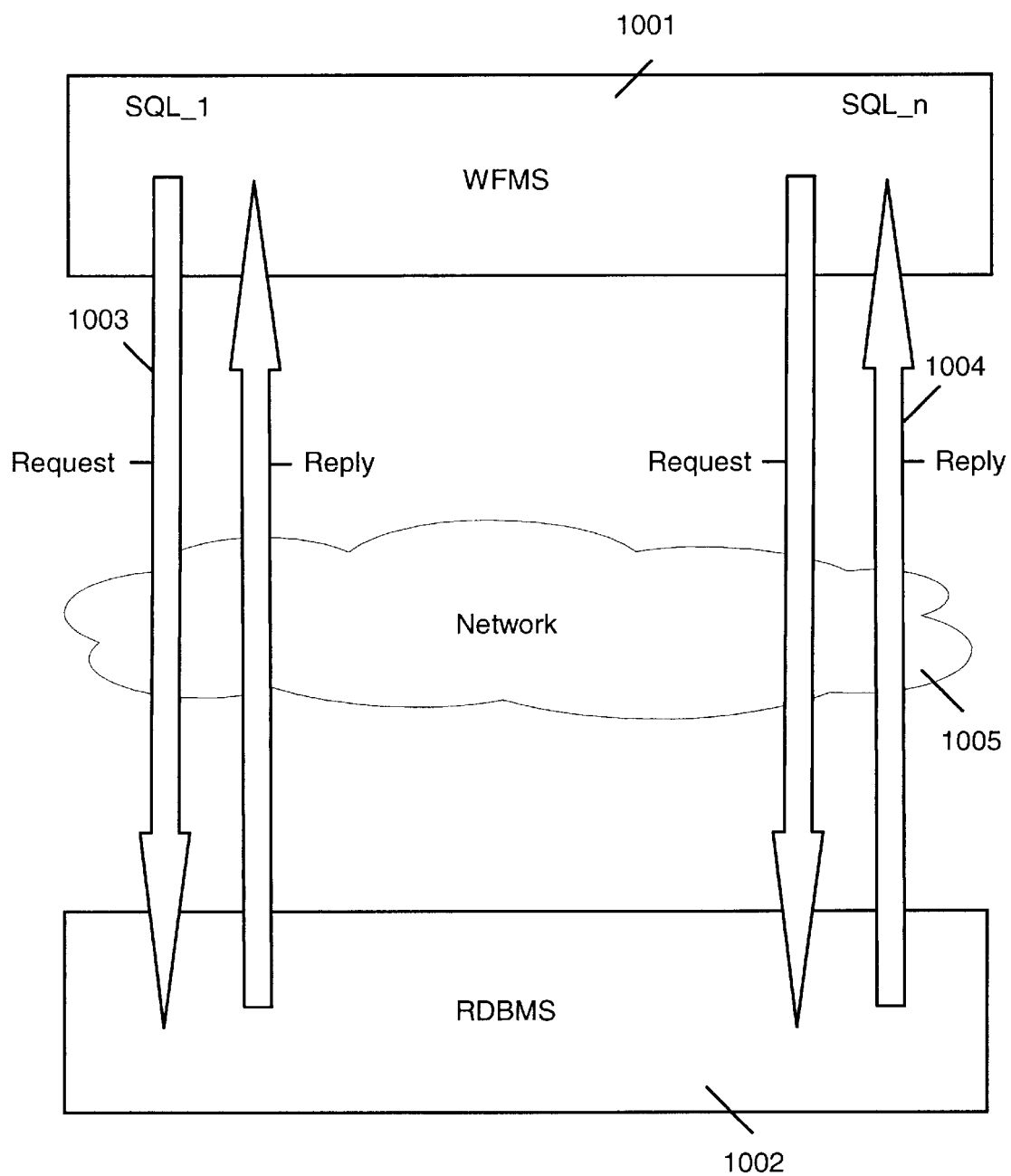
FIG. 10 is a block diagram of a conventional WFMS.

FIG. 10 shows an overall structure of a WFMS according the state of the art. The WFMS represented by a control function 1001 acts as a client to the RDBMS 1002. Every WFMS control function, as shown above, generally includes a series of SQL calls 1003 to 1004. This structure exhibits all the performance disadvantages above, as these SQL request are executed by passing system boundaries possibly involving communication across a computer network 1005 for each individual SQL request.

Figure 11:
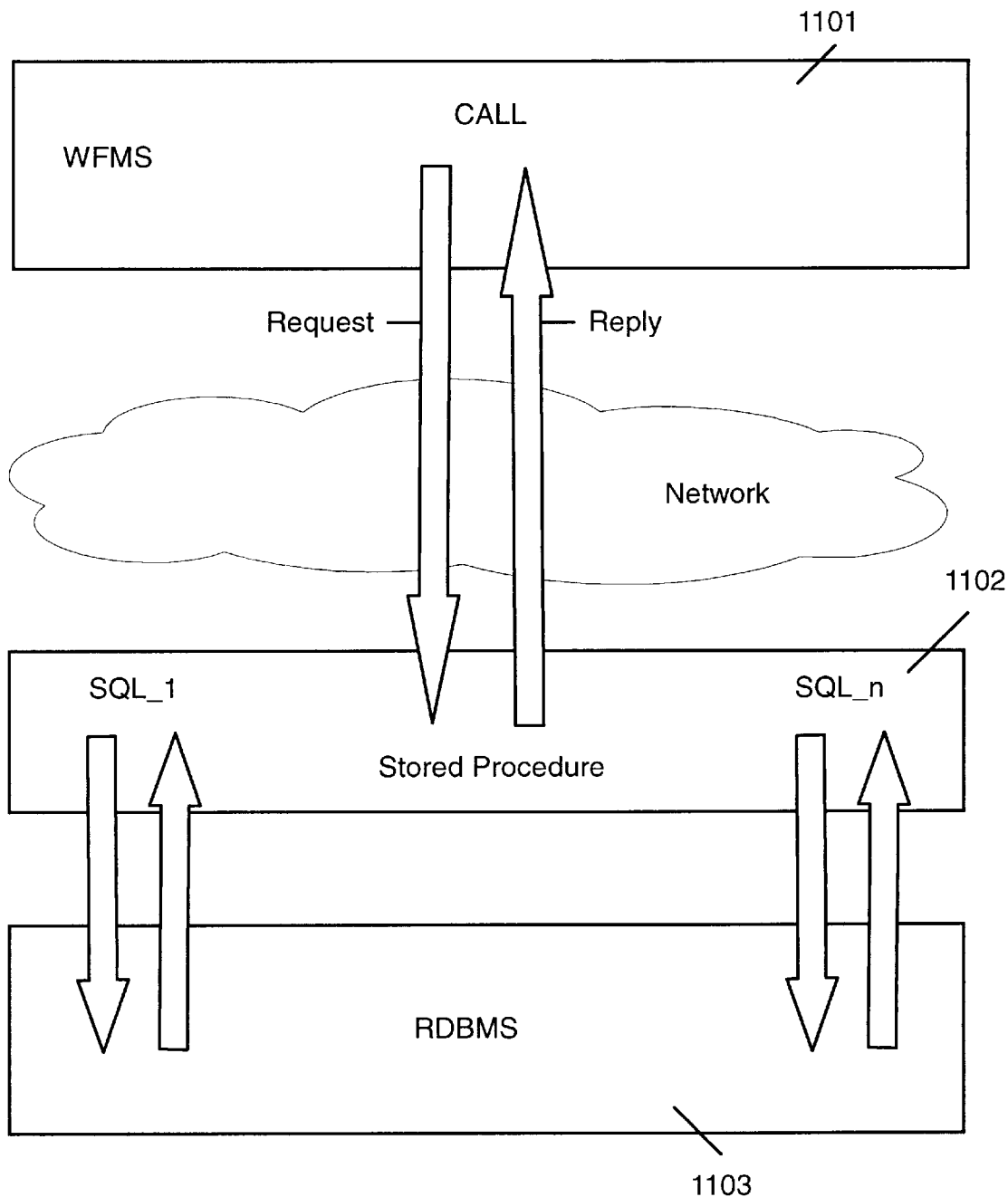
FIG. 11 is a block diagram of a WFMS architecture according to the present invention.

Implementing the WFMS control functions as stored procedures changes the structure of the WFMS implementation to architectures depicted in FIG. 11. A WFMS navigation step, such as starting a process or finishing a workitem, may be implemented as a stored procedure which is called by the WFMS. More precisely a WFMS control function stub 1101 may request the service of an associated WFMS control function core 1102, now located within the RDMS 1103. Since all work may be done in the database, reduced interaction and data passing between the WFMS and the RDBMS may be employed. All SQL calls can be performed within the stored procedure. No containers, for example, need be retrieved from the database into the WFMS workspace and stored back later into the database. By comparing the WFMS structure of FIG. 10 to that of FIG. 11 it can be seen that the current invention can achieve a large amount of integration of two separate areas of technology, WFMS and DBMS technology.

Figure 12:
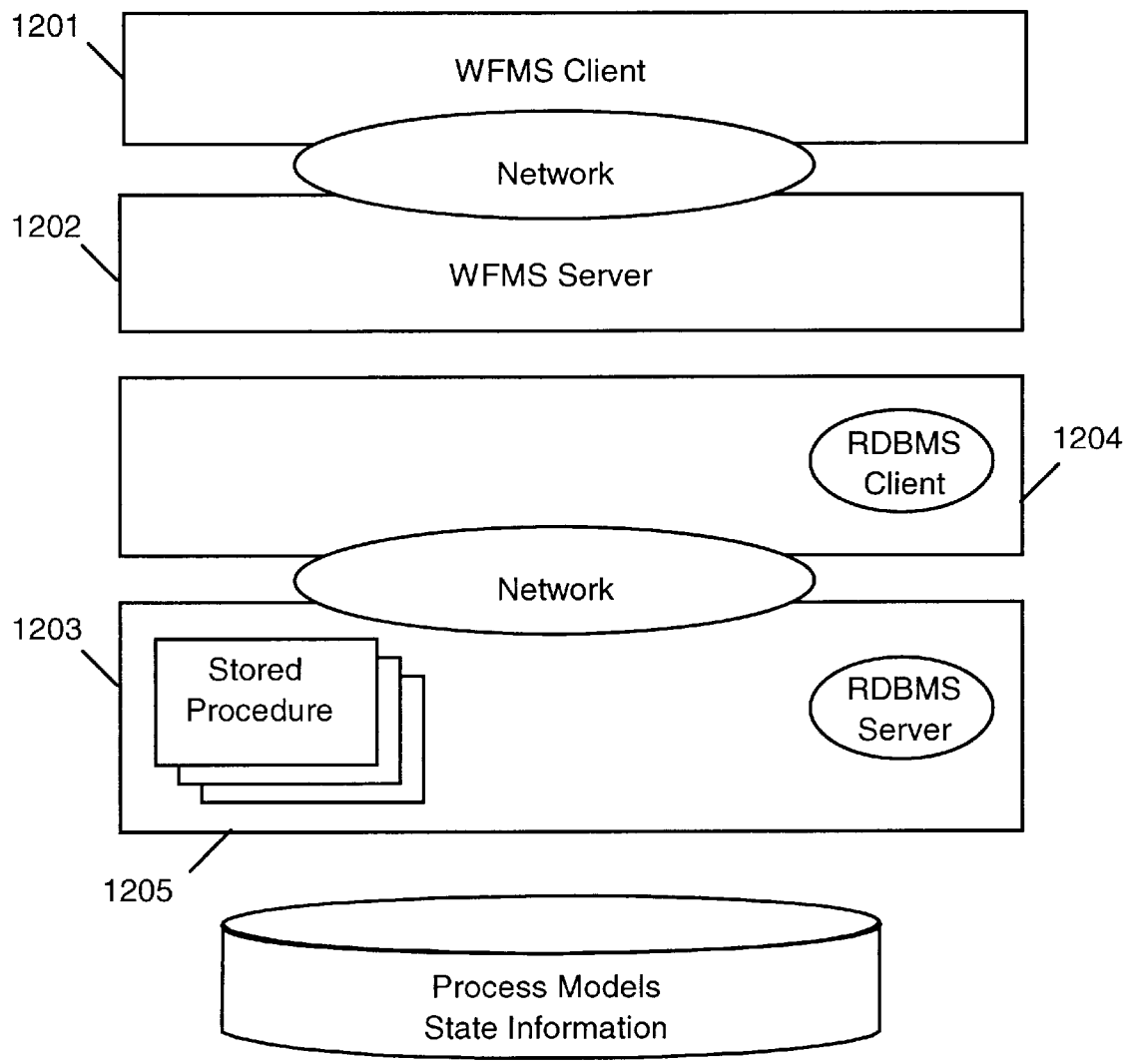
FIG. 12 is a block diagram of a three-tier WFMS architecture according to the present invention.

To demonstrate the flexibility of the current teaching it will be shown that the implementation of the database parts of the WFMS control functions as stored procedures can be completely independent of the actual architecture of the WFMS. FIG. 12 shows the system structure of a WFMS with a three tier structure encompassing a WFMS client 1201, a WFMS server 1202 and a RDBMS 1203. These structural components may be located on different computer systems or some of them may share the same physical computer system. The WFMS client on the user's workstation communicates with the WFMS server, which executes on a different workstation. The WFMS server accesses the RDBMS using the client interface 1204 provided by the RDBMS. The RDBMS itself may be on the same workstation as the WFMS server or on a different one. In this architecture, the WFMS and the RDBMS are exploiting a client/server structure. The current invention may be also applied to such a system structure by implementing the WFMS control function stub on the WFMS client 1201 and the WFMS control function core on as stored procedure 1205 within the RDBMS.

Other architectures may include a simpler, two tier architecture, where all WFMS functions are performed on the clients work station by accessing the second tier, which holds the RDBMS. In this case, only the RDBMS may exploit a client-server structure.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A data processing system for managing workflow comprising:

a database management system; and a workflow management system, the database management system and the workflow management system communicating with one another over a communication channel;

the database management system comprising a database containing process model information and state information for process instances; and a workflow management system core that is responsive to service requests received over the communication channel, to control processing of the process model information and state information for process instances in the database, to thereby administrate the state of the workflow management system within the database management system and to return the results of the processing of the process model information and state information over the communication channel; and the workflow management system comprising a workflow management system stub that generates the service requests and transmits the service requests to the workflow management system core over the communication channel; the workflow management system stub further receiving the results of processing of the process model information and state information from the workflow management system core over the communication channel, such that interactions between the workflow management system and the database need not be communicated over the communication channel.

2. A system according to claim 1 wherein the workflow management system core is implemented as at least one stored procedure in the database management system.

3. A system according to claim 1 wherein the workflow management system core comprises a plurality of workflow management cores, and wherein the workflow management system stub comprises a corresponding plurality of workflow management stubs.

4. A system according to claim 1 further comprising a workflow management client and a workflow management server, the workflow management system core being contained in the workflow management server and the workflow management stub being contained in the workflow management client.

5. A system according to claim 4 wherein the communication channel is a client-server communication channel.

6. A system according to claim 1 wherein the communication channel is a network.

7. A method of organizing a database management system and a workflow management system that run on a data processing system and that communicate with one another over a communication channel, the database management system including a database containing process model information and state information for process instances, the method comprising the steps of:

dividing the workflow management system into a workflow management system core and a workflow management system stub;

placing the workflow management system core within the database management system such that the workflow management system core is responsive to service requests over the communication channel, to control processing of the process model information and state information for process instances in the database, to thereby administrate the state of the workflow management system within the database management system and to return the results of the processing of the process model information and state information over the control channel; and providing a workflow management system stub in the workflow management system, the workflow management system stub generating the service requests and transmitting the service requests to the workflow management system core over the communication channel, the workflow management system stub further receiving the results of processing of the process model information and state information from the workflow management system core over the communication channel, such that interactions between the workflow management system and the database need not be communicated over the communication channel.

8. A method according to claim 7 wherein the workflow management system core is implemented as at least one stored procedure in the database management system.

9. A method according to claim 7 wherein the workflow management system core comprises a plurality of workflow management cores, and wherein the workflow management system stub comprises a corresponding plurality of workflow management stubs.

10. A method according to claim 7 further comprising a workflow management client and a workflow management server, the workflow management system core being contained in the workflow management server and the workflow management stub being contained in the workflow management client.

11. A method according to claim 10 wherein the communication channel is a client-server communication channel.

12. A method according to claim 7 wherein the communication channel is a network.

13. A method of organizing a database management system and a workflow management system that run on a data processing system, the database management system including a database containing process model information and state information for process instances, the method comprising the steps of:

providing a workflow management engine within the database management system so that database access operations by the workflow management engine occur within the database management system; and providing a workflow management stub in the workflow management system, the workflow management stub requesting services of the workflow management engine and receiving results of the requested services from the workflow management engine.

14. A method according to claim 13 wherein the workflow management engine is implemented as at least one stored procedure in the database management system.

15. A method according to claim 13 further comprising a workflow management client and a workflow management server, the workflow management engine being contained in the workflow management server and the workflow management stub being contained in the workflow management client.

16. A method of operating a database management system and a workflow management system that run on a data processing system and that communicate with one another over a communication channel, the database management system including a database containing process model information and state information for process instances, the method comprising the steps of:

generating service requests for the workflow management system;

transmitting the service requests to the database management system over the communication channel;

in response to received service requests over the communication channel, controlling processing of the process model information and state information for process instances in the database, to thereby administrate the state of the workflow management system within the database management system; and transmitting the results of the processing of the process model information and state information from the database management system over the communication channel such that interactions between the workflow management system and the database need not be communicated over the communication channel.

17. A method according to claim 16 wherein the communication channel is a client-server communication channel.

18. A method according to claim 17 wherein the communication channel is a network.

19. A computer program product for managing workflow, the computer program product comprising a computer-readable storage medium having computer-readable program code means embodied in the medium, the computer-readable program code means comprising:

computer-readable program code means for providing a database management system; and computer-readable program code means for providing a workflow management system, the database management system and the workflow management system communicating with one another over a communication channel;

the database management system comprising computer-readable program code database means for containing process model information and state information for process instances; and computer-readable program code workflow management system core means that is responsive to service requests received over the communication channel, for controlling processing of the process model information and state information for process instances in the database, to thereby administrate the state of the workflow management system within the database management system and for returning the results of the processing of the process model information and state information over the communication channel; and the workflow management system comprising computer-readable program code workflow management system stub means for generating the service requests and for transmitting the service requests to the workflow management system core over the communication channel, the workflow management system stub means further comprising computer-readable program code means for receiving the results of processing of the process model information and state information from the workflow management system core over the communication channel, such that interactions between the workflow management system and the database need not be communicated over the communication channel.

20. A computer program product according to claim 19 wherein the workflow management system core means is implemented as at least one stored procedure in the database management system.

21. A computer program product according to claim 19 further comprising a workflow management client and a workflow management server, the workflow management system core means being contained in the workflow management server and the workflow management stub means being contained in the workflow management client.

22. A computer program product for operating a database management system and a workflow management system that run on a data processing system and that communicate with one another over a communication channel, the database management system including a database containing process model information and state information for process instances, the computer program product comprising a computer-readable storage medium having computer-readable program code means embodied in the medium, the computer-readable program code means comprising:

computer-readable program code means for generating service requests for the workflow management system;

computer-readable program code means for transmitting the service requests to the database management system over the communication channel;

computer-readable program code means, responsive to received service requests over the communication channel, for controlling processing of the process model information and state information for process instances in the database, to thereby administrate the state of the workflow management system within the database management system; and computer-readable program code means for transmitting the results of the processing of the process model information and state information from the database management system over the communication channel such that interactions between the workflow management system and the database need not be communicated over the communication channel.

23. A computer program product according to claim 22 wherein the communication channel is a client-server communication channel.

24. A computer program product according to claim 22 wherein the communication channel is a network.

* * * * *